US011743250B2

(12) United States Patent
Bachorik et al.

(10) Patent No.: US 11,743,250 B2
(45) Date of Patent: Aug. 29, 2023

(54) TIME-BASED TOKEN TRUST DEPRECIATION

(71) Applicant: Capital One Services, LLC, McLean, VA (US)

(72) Inventors: Justin Bachorik, Silver Spring, MD (US); Randall Randall, New York, NY (US); Brandee Shin, Herndon, VA (US); Rocky Gray, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/476,664

(22) Filed: Sep. 16, 2021

(65) Prior Publication Data

US 2022/0006802 A1 Jan. 6, 2022

Related U.S. Application Data

(63) Continuation of application No. 16/654,856, filed on Oct. 16, 2019, now Pat. No. 11,171,945.

(51) Int. Cl.
*H04L 9/40* (2022.01)
*G06Q 20/38* (2012.01)
*G06Q 20/10* (2012.01)

(52) U.S. Cl.
CPC .......... *H04L 63/083* (2013.01); *G06Q 20/10* (2013.01); *G06Q 20/3821* (2013.01)

(58) Field of Classification Search
None
See application file for complete search history.

(56) References Cited

U.S. PATENT DOCUMENTS

| 6,691,232 B1 | 2/2004 | Wood et al. |
| 9,608,974 B2 | 3/2017 | Barrows et al. |
| 9,836,594 B2 | 12/2017 | Zhang et al. |

(Continued)

OTHER PUBLICATIONS

Author unknown, Enabling URL token validation, Jan. 2019, Fastly Help Guides, retrieved from https://docs.fastly.com/en/guides/enabling-url-token-validation (Year: 2019).*

*Primary Examiner* — Gregory S Cunningham, II
(74) *Attorney, Agent, or Firm* — Sterne, Kessler, Goldstein & Fox P.L.L.C.

(57) ABSTRACT

Disclosed herein are system, method, and device embodiments for time-based trust token (TBTT) depreciation. In an example embodiment, a service provider system (e.g., a service provider and API service) may receive a connection request including a demographic attribute associated with a first client account from a partner device, match the demographic attribute to client information associated with the first client account, send the partner device a connection request identifier and a URL including a depreciating token, and authenticate a second client account via a login page associated with the URL. Further, the service provider system may receive a verification request including the connection request identifier and the depreciating token, determine a security context of the depreciating token based on a depreciation function and the verification request, and determine, based on the security context, whether to create a connection between the second client account and partner device within the service provider system.

20 Claims, 6 Drawing Sheets

(56) References Cited

U.S. PATENT DOCUMENTS

| | | | |
|---|---|---|---|
| 9,996,835 B2 | 6/2018 | Dill et al. | |
| 10,164,999 B1 | 12/2018 | Casillas et al. | |
| 2010/0205053 A1 | 8/2010 | Shuster | |
| 2012/0166803 A1 | 6/2012 | Hu et al. | |
| 2014/0279556 A1 | 9/2014 | Priebatsch | |
| 2016/0086184 A1 | 3/2016 | Carpenter et al. | |
| 2016/0087957 A1 | 3/2016 | Shah et al. | |
| 2016/0189119 A1 | 6/2016 | Bowman et al. | |
| 2016/0328707 A1 | 11/2016 | Wagner et al. | |
| 2017/0004506 A1 | 1/2017 | Steinman et al. | |
| 2017/0237726 A1 | 8/2017 | Wang | |
| 2017/0289168 A1* | 10/2017 | Bar | H04L 63/102 |
| 2018/0075231 A1* | 3/2018 | Subramanian | H04L 63/0807 |
| 2018/0165781 A1 | 6/2018 | Rodriguez et al. | |
| 2019/0164156 A1 | 5/2019 | Lindemann | |
| 2019/0199723 A1 | 6/2019 | Tak | |
| 2019/0229900 A1* | 7/2019 | Khristi | H04L 9/0827 |
| 2019/0372962 A1 | 12/2019 | Maria et al. | |
| 2019/0392428 A1 | 12/2019 | Bolla | |
| 2020/0137109 A1 | 4/2020 | Endler | |
| 2021/0119986 A1 | 4/2021 | Bachorik et al. | |

\* cited by examiner

TIME-BASED TOKEN TRUST DEPRECIATION

CROSS-REFERENCE TO RELATED APPLICATIONS

This application is a continuation of U.S. patent application Ser. No. 16/654,856, filed on Oct. 16, 2019, the contents of which is incorporated in its entirety herein.

BACKGROUND

Many computing systems employ security tokens during authentication and/or authorization workflows. Typically, a security token is issued to a device and redeemable to access a digital resource. However, once a security token is issued, it may be captured by a malicious party and used in an attack (e.g., session hijacking) against a computing system. In addition, computing systems often fail to utilize security information provided by expired and/or stale security tokens during security workflows.

BRIEF DESCRIPTION OF THE DRAWINGS

The accompanying drawings, which are incorporated herein and form part of the specification, illustrate the present disclosure and, together with the description, further serve to explain the principles of the disclosure and enable a person skilled in the relevant art to make and use the disclosure.

The drawing in which an element first appears is typically indicated by the leftmost digit or digits in the corresponding reference number.

DETAILED DESCRIPTION OF THE INVENTION

Provided herein are system, apparatus, device, method and/or computer program product embodiments, and/or combinations (including sub-combinations) thereof, for implementing time-based trust token (TBTT) depreciation.

As mentioned above, security tokens may be used to perform malicious attacks (e.g., session hijacking) that provide unauthorized access to computing resources. Embodiments herein address these challenges by employing a TBTT with a dynamic security context based on a trust depreciation function that limits opportunity for malicious use. Further, embodiments herein may further securely utilize a depreciated TBTT when providing access to a computing resource.

Figure 1:
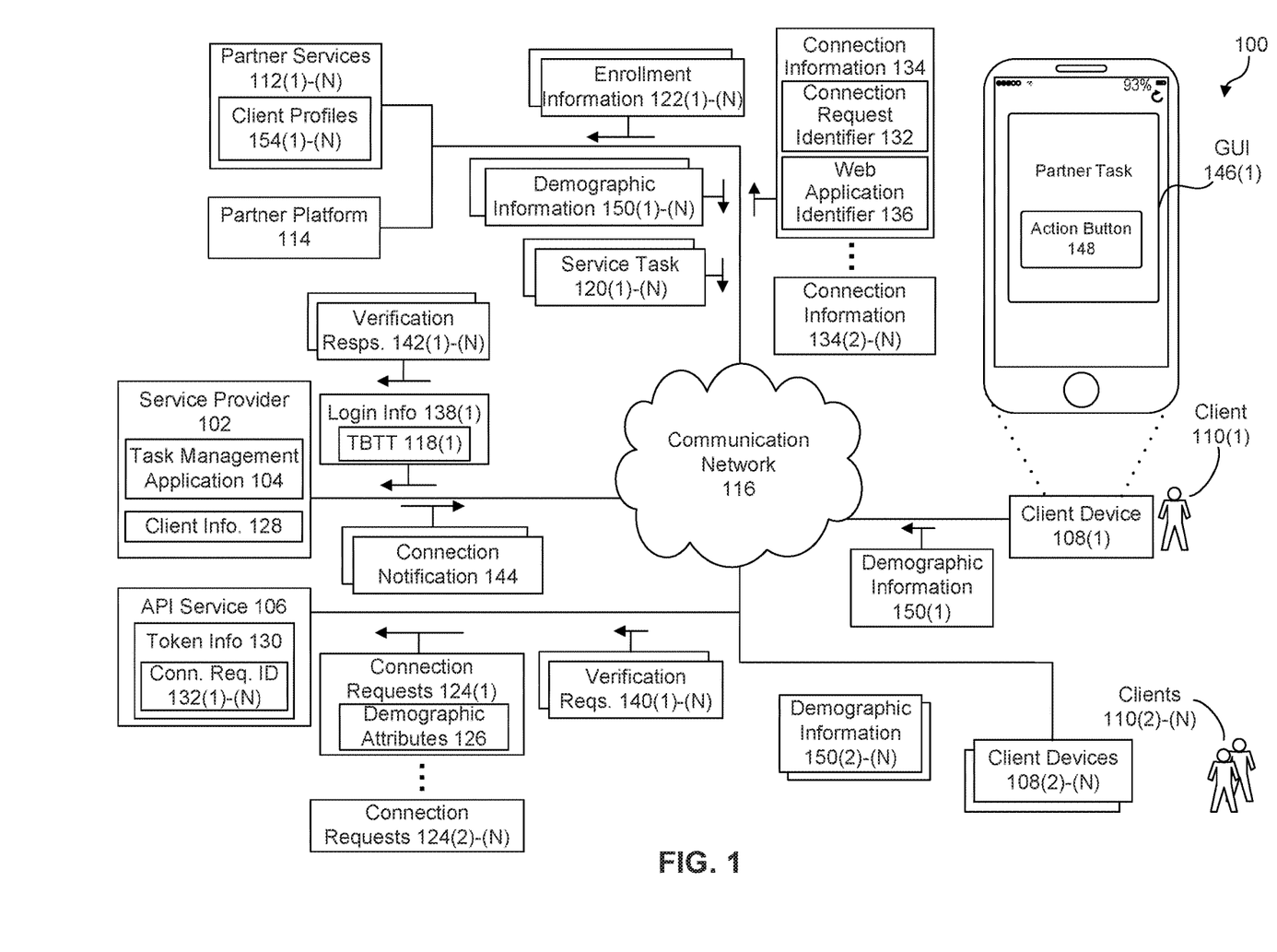
FIG. 1 is a block diagram of an example framework for implementing time-based token trust depreciation, according to embodiments of the present disclosure.

FIG. 1 illustrates a diagram of an example framework for implementing a system for TBTT depreciation, according to embodiments of the present disclosure. As illustrated in FIG. 1, a computing system 100 may include a service provider 102 including a task management application 104, an API service 106, a plurality of client devices 108(1)-(N) associated with a plurality of clients 110(1)-(N), a plurality of partner services 112(1)-(N), and a partner platform 114. Further, as illustrated in FIG. 1, the service provider 102, the API service 106, the client devices 108(1)-(N), the partner services 112(1)-(N), and the partner platform 114 may communicate via a communication network(s) 116. The communication network(s) 116 may include any or all of a private network, personal area network (PAN), Local-Area Network (LAN), Wide-Area Network (WAN), the Internet, or any other suitable network. Further, the connection between the service provider 102, the API service 106, the client devices 108(1)-(N), the partner services 112(1)-(N), or the partner platform 114, and the communication network(s) 116 may be a wireless connection (e.g., Bluetooth, Wi-Fi connection, etc.), or a wired connection (e.g., Ethernet, universal serial bus (USB), etc.), or a combination thereof.

In some embodiments, each client device 108 is associated with a client 110. For instance, the client 110(1) may employ the client device 108(1), the client 110(2) may employ the client device 108(2), the client 110(N) may employ the client device 108(N), and so forth. Some examples of the client devices 108(1)-(N) include, but are not limited to, tablets, smartphones, mobile devices, personal computers, laptop computers, appliances, IoT devices, wearables, etc. Further, as described in detail herein, the clients 110(1)-(N) may employ the client devices 108(1)-(N) to access resources provided by the service provider 102 or the partner services 112(1)-(N) via the communication network 116. In some embodiments, the partner platform 114 may be a centralized proxy or aggregator for the partner services 112(1)-(N). Additionally, the API service 106 may be a web service providing one or more methods for implementing TBTT depreciation within the computing system 100. For example, the service provider 102, the client devices 108(1)-(N), the partner services 112(1)-(N), and the partner platform 114 may call the methods of the API service 106 to leverage TBTTs 118 for providing resources within the computing system 100. In some examples, the API service 106 may be a simple object access protocol application programming interface (SOAP API) or a representational state transfer application programming interface (REST API)

In some embodiments, the service provider 102 may be operated by or otherwise associated with a financial institution. In addition, the clients 110(1)-(N) may have financial accounts with the financial institution. Further, the service provider 102 may be an online banking platform including the task management application 104. As used herein, in some embodiments, "task management" may refer to creation, modification, deletion, performance, confirmation, administration, and completion of a task. As used herein, and in some embodiments, an "application" may refer to any computer program or software (e.g., client, agent, application, mobile application, web application, hybrid application, computer program, desktop application, or module) operable to run on the service provider 102 and/or client devices 108(1)-(N). In addition, the task management application 104 may generate service tasks 120(1)-(N) for the clients 110(1)-(N), display the service tasks 120(1)-(N) to the clients 110(1)-(N) via the client devices 108(1)-(N), and enable the clients 110(1)-(N) to complete the service tasks 120(1)-(N) via the client devices 108(1)-(N). In some examples, a service task 120 may include an electronic bill or payment request from a first user of the task management application 104 to a second user of the task management application 104 for services rendered by the first user to the second user. For instance, the partner service 112(1) may render a service to the client 110(1). Further, the partner service 112(1) may generate a service task 120(1) representing an electronic bill for the service rendered to the client 110(1), and request that the task management application 104 display the service task 120(1) to the client 110(1) via the client device 108(1). Additionally, the client 110(1) may use a financial account accessible via the service provider 102 to pay the bill associated with the service task 120(1). Some other examples of service tasks include billing notification, billing payment confirmation, document signature, information requests, etc.

In some embodiments, the service provider 102 may require the partner service 112(1) to have a connection to the client 110(1) before permitting the partner service 112(1) to assign the service tasks 120(1)-(N) to the client 110(1). Further, the service provider 102 may employ the TBTT 118(1) to create the connection between the partner service 112(1) and the client 110(1). Although embodiments herein disclose employing the TBTTs 118 to access the task management application 104, the TBTTs 118 may be implemented in other computing environments for authentication, authorization, or any other security process.

As an example, the client device 108(1) may send enrollment information 122(1) to the partner service 112(1). The enrollment information 122(1) may represent consent by the client 110(1) to connect with the partner service 112(1) within the task management application 104. For instance, the client device 108(1) may send the enrollment information 122(1) to the partner service 112(1) based on the client 110(1) selecting graphical controls (e.g., a checkbox and a button) indicating that the client 110(1) intends to create the connection with the partner service 112(1) via the service provider 102. In response to receipt of the enrollment information 122(1), the partner service 112(1) may send a connection request 124(1) to the API service 106. The connection request 124(1) may identify the partner service 112(1) and the client 110(1). In some embodiments, the connection request 124(1) may include a partner service identifier identifying the partner service 112(1), a client identifier identifying the client 110(1), and one or more demographic attributes 126 associated with the client 110(1). Some examples of a demographic attribute include a name, email address, telephone number, physical addresses, etc.

Upon receipt of the connection request 124(1), the API service 106 may determine whether the demographic attribute 126 matches client information 128(1) associated with the client 110(1). If the demographic attribute 126 matches the client information 128(1), the API service 106 may generate the TBTT 118(1) for creating the connection between the client 110(1) and the partner service 112(1) within the task management application 104. The API service 106 may further store token information 130 including a connection request identifier 132(1) identifying the request for connection between the client 110(1) and the partner service 112(1). In some embodiments, the TBTT 118 may include temporal information identifying the date and time of creation of the TBTT 118(1). Additionally, or alternatively, the token information 130 may include temporal information identifying the date and time of creation of the TBTT 118(1).

Further, the API service 106 may send the connection information 134(1) to the partner service 112(1). The connection information 134(1) may include a web application identifier 136(1) including the TBTT 118, and the connection request identifier 132(1). In some examples, the web application identifier 136(1) may be a universal resource locator (URL) with the TBTT 118 appended thereto within a query string. Further, the URL may be the address of a login page or other form of authentication for the task management application 104. As referred to herein, in some embodiments, a "query string" may be a part of a URL which assigns values to specified parameters. In some embodiments, a query string includes fields added to a base URL by a Web browser or other client application, for example as part of an HTML, form.

In response to receiving the connection information 134(1), the partner service 112(1) may redirect the client device 108(1) to the login page represented by the web application identifier 136(1). In some other embodiments, the partner service 112(1) may embed the login page within a web page of the partner service 112(1). After the redirection is performed, the client 110(1) may perform an authentication process with the service provider 102 via the login page. In some embodiments, the client device 108(1) may send the login information 138 including the TBTT 118(1) to the service provider 102 during the authentication process. Performing the authentication process ensures that the client device 108(1) is associated with a client 110 having an account with the service provider 102. But the TBTT 118(1) is still required to provide proof that the API service 106 should create a connection between the client 110(1) and the partner service 112(1). For example, a malicious client 110(2) of the service provider 102 may endeavor to create a connection between their account at the service provider 102 and the account of the client 110(1) with the partner service 112(1).

As used herein, in some embodiments, "authentication" may refer to a process by which an entity (e.g., a user, a device, or a process) makes their identity known to a computing system (e.g., the service provider 102). Further, authentication may be based on at least one of information an entity knows (e.g., a password, a PIN code, a digital certificate, a secret, a cryptographic key, a social security number, a zip code, a phone number, etc.), an object an entity possesses (e.g., a smart card, a hardware token, a dynamic password generator, etc.), or something an entity is (e.g., a fingerprint, a voiceprint, a retinal scan, etc.).

In some embodiments, the service provider 102 may determine that the client 110(1) endeavors to create a connection at the service provider 102 between the client 110(1) and the partner service 112(1) based upon the redemption of the TBTT 118(1) via the authentication process. Additionally, the service provider 102 may request that the API service 106 verify the TBTT 118(1). For example, the service provider 102 may send a verification request 140(1) to the API service 106. The verification request 140(1) may include the TBTT 118(1) or an identifier of the token information 130 associated with the TBTT 118(1). In response to receipt of the verification request 140(1), the API service 106 may determine a security context of the TBTT 118(1) based upon the token information 130 stored during the generation of the TBTT 118(1). Further, the security context may indicate the degree to which the TBTT 118(1) has depreciated between issuance of the TBTT 118(1) to the partner service 112(1) and redemption of the TBTT 118(1) by the client device 108(1). In some embodiments, the API service 106 may employ a depreciation function to determine the security context of the TBTT 118(1). For instance the API service 106 may employ a time-based depreciation function that determines the security context (e.g., full trust, limited trust, no trust, etc.) based upon the duration of time between issuance of the TBTT 118(1) to the partner service 112(1) and redemption of the TBTT 118(1) by the client device 108(1) (i.e., the age of the TBTT 118(1) at the time of redemption).

For example, the API service 106 may determine that the TBTT 118(1) has not depreciated in trust (i.e., full trust) based upon the duration of time between issuance of the TBTT 118(1) and redemption of the TBTT 118(1) being less than a first predetermined value (e.g. fifteen minutes). As another example, the API service 106 may determine that the TBTT 118(1) has depreciated to a lower level of trust (i.e., limited trust) based upon the duration of time between issuance of the TBTT 118(1) and redemption of the TBTT 118(1) being greater than the first predetermined value (e.g. fifteen minutes), and lower than a second predetermined value (e.g. thirty minutes). As yet still another example, the API service 106 may determine that the TBTT 118(1) has depreciated to the lowest level of trust (i.e., no trust) based upon the duration of time between issuance of the TBTT 118(1) and redemption of the TBTT 118(1) being greater than a second predetermined value. Once the API service 106 determines the security context of the TBTT 118(1), the API service 106 may send a verification response 142(1) to the service provider 102. The verification response 142(1) may identify the security context of the TBTT 118(1). Although three trust levels are discussed herein, the security context of the TBTT 118(1) may be mapped to less than three trust levels or more than three trust levels.

Further, in some embodiments, the depreciation function of the API service 106 may determine the security context of the TBTT 118(1) based at least in part on non-temporal information. For example, the API service 106 may further determine the security context of the TBTT 118(1) based upon usage history of the clients 110(1)-(N), client preferences, location information associated with the client devices 108(1)-(N), attributes of web browsers used to login to the service provider 102, or one or more device attributes of the client devices 108(1)-(N). For example, the API service 106 may determine that a trust level of the TBTT 118(1) has depreciated based upon the TBTT 118(1) being received from a web browser that has not been previously used by the client device 108(1) or the client 110(1). As another example, the API service 106 may determine that a trust level of the TBTT 118(1) has depreciated based upon the client device 108(1) being located in a geographic location not previously associated with the client device 108(1) or the client 110(1). As yet still another example, the API service 106 may determine that a trust level of the TBTT 118(1) has depreciated based upon the client device 108(1) being an electronic device not previously used by the client 110(1) with the service provider 102 or API service 106.

As further described below with respect to FIG. 2, if the API service 106 determines that the security context of the TBTT 118(1) is full trust, the service provider 102 may create the connection between the partner service 112(1) and a client account of the client 110(1). In some embodiments, the service provider 102 may employ a method call of the API service 106 to create the connection. Further, the service provider 102 or the API service 106 may send a connection notification 144(1) to the client device 108(1) and/or the partner service 112(1). The connection notification 144(1) may indicate that the connection has been created between a client account of the client 110(1) and the partner service 112(1). Upon creation of the connection, the partner service 112(1) may assign the service tasks 120(1)-(N) to the client 110(1). For instance, the partner service 112(1) generate the service task 120(1) describing a bill owed by the client 110(1) to the partner service 112(1), and assign the service task 120(1) to the client 110(1) via the task management application 104 of the service provider 102.

Further, the service provider 102 may send the service task 120(1) to the client device 108(1) based on the connection. Upon receipt of the service task 120(1), the client device 108(1) may display the service task 120(1) via a graphical user interface (GUI) 146. In addition, the task management application 104 may present one or more actions that the task management application 104 can perform in view of the service task 120(1).

For instance, the task management application 104 may present a control 148 (e.g., a button) for paying the bill associated with the service task 120(1). In response to the client 110(1) selecting the control 148, the task management application 104 may perform an action. For example, the task management application 104 may send a payment request to the service provider 102, and the service provider 102 may facilitate a funds transfer from a financial account of the client 110(1) to a financial account associated with the partner service 112(1) based on the payment request.

As further described below with respect to FIG. 3, if the API service 106 determines that the security context of the TBTT 118(1) is limited trust, the service provider 102 may require the client 110(1) to perform additional authentication steps before creating the connection between the client 110(1) and the partner service 112(1). For example, the service provider 102 may request demographic information 150(1) from the client device 108(1). In some embodiments, the service provider 102 may request the demographic information 150(1) based upon an attribute of the partner service 112(1). For example, if the partner service 112(1) is a cellular telephone service provider, the demographic attribute 150(1) may be related to cellular phone use by the client, e.g., a telephone number or of the client. In some other embodiments, the service provider 102 may prompt for demographic information 150(1) matching the demographic attributes 126.

Upon receipt of the demographic information 150(1), the API service 106 may compare the demographic information 150(1) to the newly acquired demographic information 152(1) received from the partner service 112(1) or the demographic attributes 126 previously received from the partner service 112(1). If the demographic information 150(1) matches the demographic information 152(1) or the demographic attributes 126, the service provider 102 may create the connection between a client account of the client 110(1) and the partner service 112(1). As such, the service provider 102 may utilize the security context and connection information of a depreciated token (i.e., the TBTT 118(1)) to create the connection instead of completely disregarding the TBTT 118(1) once it no longer has a full trust security context.

Further, the service provider 102 or the API service 106 may send the connection notification 144(1) to the client device 108(1) and/or the partner service 112(1). Upon creation of the connection, the partner service 112(1) may assign tasks to the client 110(1). For instance, as described in detail above, the partner service 112(1) may send the service task 120(1) to the client device 108(1) via the connection, the task management application 104 may display the service task 120(1) to the client 110(1) via the client device 108(1), and the task management application 104 may facilitate performance of an action associated with the service task 120(1) based on user selection of the control 148 presented within the GUI 146.

As further described below with respect to FIG. 4, if the API service 106 determines that the security context of the TBTT 118(1) is no trust and reject the connection request 124(1). Further, the API service 106 may identify partner services 112(1)-(N) associated with the client 110(1), and the service provider 102 may present the identified partner services 112(1)-(N) to the client 110(1) via the task management application 104. Further, the service provider 102 and API service 106 may facilitate the creation of a connection between the client 110(1) and the identified partner services 112(1)-(N).

For example, the API service 106 may identify client information 128(1) associated with the client 110(1). In some embodiments, the client information 128(1) may differ from the demographic attributes 126 received from partner service 112(1). For instance, the client information 128(1) may be user information maintained by the API service 106 or the service provider 102 with respect to the client 110(1). Further, the API service 106 may send the client information 128(1) to the partner platform 114. The partner platform 114 may identify a plurality of partner services 112(1)-(N) associated with the client 110(1) based upon the client information 128(1).

For instance, the partner platform 114 may have access to a data store including client profiles 154(1)-(N) for the clients 110(1)-(N). In some examples, the client profiles 154(1)-(N) may identify relationships between the clients 110(1)-(N) and the partner services 112(1)-(N). As an example, the client profile 154(1) for the client 110(1) may identify that the client 110(1) has a relationship with the partner services 112(1)-(2). Further, the partner platform 114 may search the client profile 154(1) using the client information 128(1) to determine that the client 110(1) has a pre-existing relationship with the partner services 112(1)-(2). Once the partner platform 114 has identified the relationship between the client 110(1) and the partner services 112(1)-(2), the partner platform 114 may send the API service 106 identifiers identifying the partner services 112(1)-(2). Additionally, the API service 106 may instruct the service provider 102 to present the partner services 112(1)-(2) to the client 110(1) via the task management service 104. In some embodiments, the task management service 104 may maintain state information indicating that the partner service 112(1) is associated with the TBTT 118(1) redeemed by the client 110(1).

Further, as an example, the client 110(1) may request creation of a connection with the partner services 112(1) via the task management service 104. In response to a request to create a connection with the partner service 112(2), the service provider 102 may prompt the client 110(1) for a challenge response, and request the expected response to the challenge response from the partner service 112(2). In addition, the API service 106 may compare the challenge response to the expected response. If the challenge response matches the expected response, the API service 106 may create the connection between the client 110(1) and the partner service 112(1). Upon creation of the connection, the partner service 112(1) may assign the service tasks 120(1)-(N) to the client 110(1). For instance, as described in detail above, the partner service 112(1) may send the service task 120(1) to the client device 108(1) via the connection, the task management application 104 may display the service task 120(1) to the client 110(1) via the client device 108(1), and the task management application 104 may facilitate performance of an action associated with the service task 120(1) based on user selection of the control 148 presented within the GUI 146.

Figure 2:
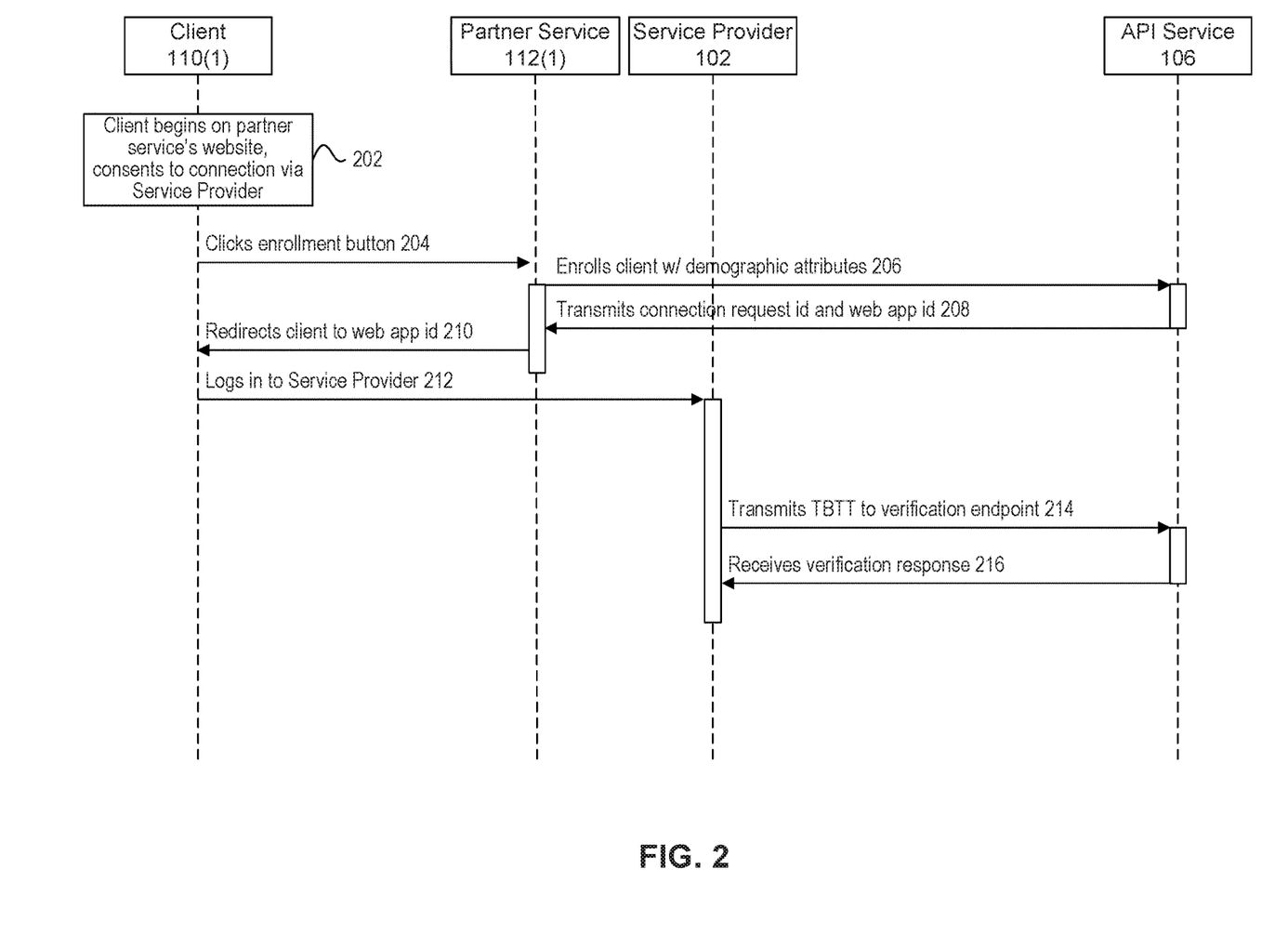
FIG. 2 is a sequence diagram illustrating an example process using time-based token trust depreciation, according to embodiments of the present disclosure.

FIG. 2 is a sequence diagram illustrating an example process using time-based token trust depreciation, according to embodiments of the present disclosure. At step 202, a client 110(1) may visit the partner service 112(1) or partner platform 114 with the intent of establishing a connection with the partner service 112(1) at the service provider 102. For example, the client 110(1) may have a pre-existing relationship with the partner service 112(1), and endeavor to manage tasks related to the partner service 112(1) via the service provider 102.

At step 204, the client 110(1) may click an enrollment button within a graphical user interface presented by the partner service 112(1) or partner platform 114 to the client device 108(1), thereby consenting to the creation of a connection between the client 110(1) and the partner service 112(1) via the service provider 102. Further, the client device 108(1) may send the enrollment information 122(1) to the partner service 112(1) or the partner platform 114.

At step 206, the partner service 112(1) or partner platform 114 may send the connection request 124(1) to the API service 106. In some embodiments, the connection request 124(1) may include one or more demographic attributes 126 associated with client 110(1). Some examples of a demographic attributes include a name, email address, telephone number, physical address associated with the client 110(1). Further, in some instances, the connect request 124(1) may include a client identifier identifying the client 110(1) and a partner service identifier identifying the partner service 112(1).

At step 208, the API service 106 may receive the connection request 124, generate the TBTT 118(1) based on the connection request 124, and send the connection information 134(1) to the partner service 112(1). The connection information 134(1) may include the connection request identifier 132(1) and the web application identifier 136(1). In some embodiments, the web application identifier 136(1) may be a URL link including the TBTT 118(1). Further, the URL link may be the address of a login page of the service partner 102.

At step 210, the partner service 112(1) may redirect the client device 108(1) to the login page associated with the URL link of the web application identifier 136(1). As used herein, in some embodiments, a "redirect" may refer to a technique for forwarding a web visitor from a first domain to a second domain associated with a different URL. For instance, at step 210, the client device 108(1) may initially visit the partner service 112(1) via a web browser, and the domain of the partner service 112(1) may cause the domain of the service provider 102 to load within the web browser.

At step 212, the client device 108(1) may login into the service provider 102 at the URL link. For example, the client device 110(1) may load a webpage of the service provider 102, and provide the login information 138(1) to the service provider 102. In some embodiments, the login information 138(1) may include authentication credentials and the TBTT 118(1). Some examples of authentication credentials include a password, a PIN code, a digital certificate, a secret, a social security number, or biometric information.

At step 214, the service provider 102 may send a verification request 140(1) including the TBTT 118(1) to the API service 106. Further, upon receipt of the verification request 140(1), the API service 106 may determine the security context of the TBTT 118(1) based on a depreciation function and the TBTT 118(1). For example, the API service 106 may determine that the security context of the TBTT 118(1) is full trust based upon the elapsed time between issuance of the TBTT 118(1) and redemption of the TBTT 118(1) being less than a predetermined value.

At step 216, the API service 106 may send a verification response 142(1) to the service provider 102 indicating that the service provider 102 should create the connection between the client 110(1) and the partner service 112(1) based on the security context of the TBTT 118(1) being full trust. As described in detail herein, once the connection has been created between the client 110(1) and the partner service 112(1), the partner service 112(1) may send the service task 120(1) to the client device 110(1) via the task management application 104. Further, the service provider 102 or API service 106 may send the connection notification 144 to the client device 108(1) or the partner service 112(1) indicating that the connection has been created.

Figure 3:
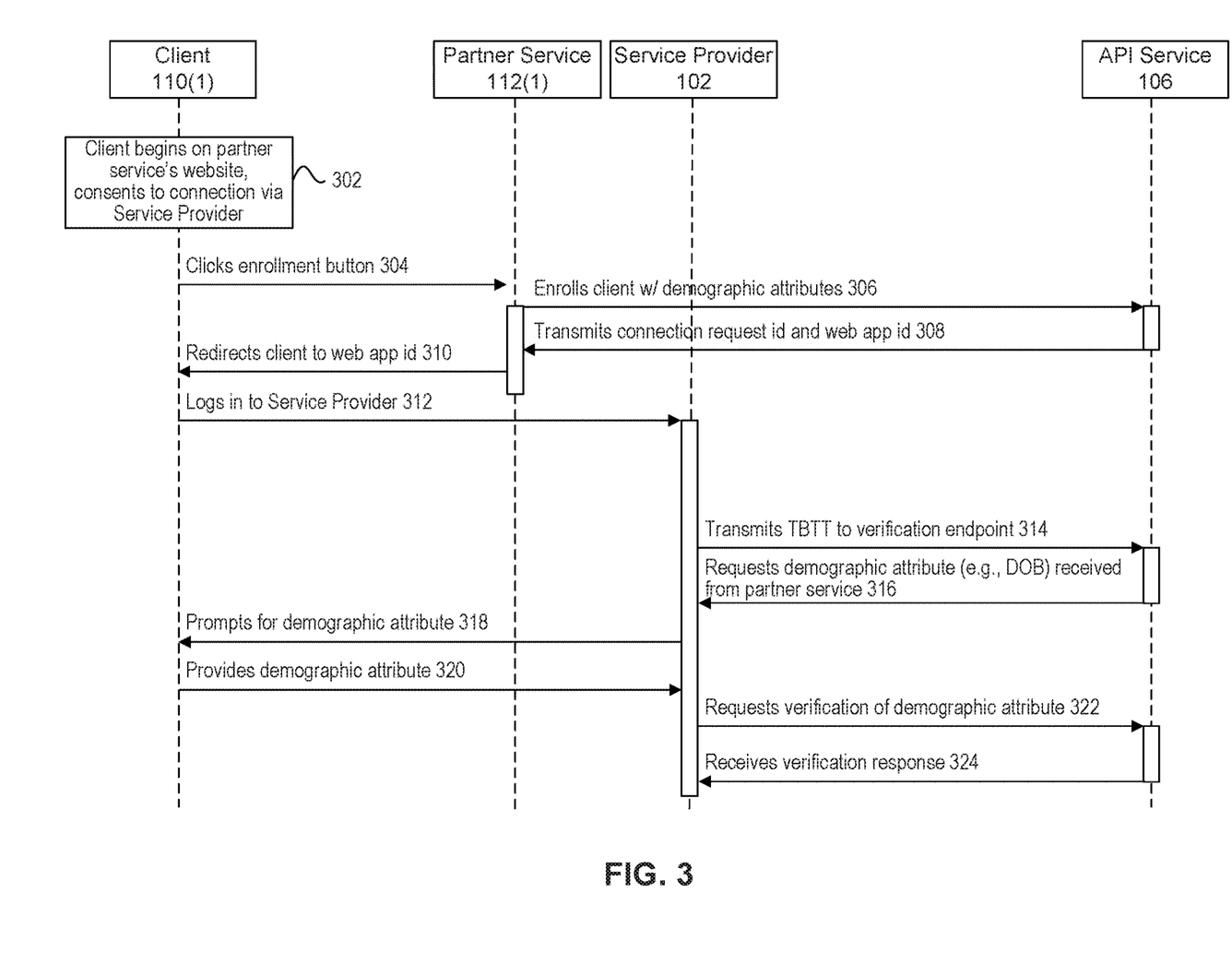
FIG. 3 is a sequence diagram illustrating an example process using time-based token trust depreciation, according to embodiments of the present disclosure.

FIG. 3 is a sequence diagram illustrating an example process using time-based token trust depreciation, according to embodiments of the present disclosure. At step 302, a client 110(1) may visit the partner service 112(1) or partner platform 114 with the intent of establishing a connection with the partner service 112(1) at the service provider 102. For example, the client 110(1) may have a pre-existing relationship with the partner service 112(1), and endeavor to manage tasks related to the partner service 112(1) via the service provider 102.

At step 304, the client 110(1) may click an enrollment button within a graphical user interface presented by the partner service 112(1) or partner platform 114 to the client device 108(1), thereby consenting to the creation of a connection between the client 110(1) and the partner service 112(1) via the service provider 102. Further, the client device 108(1) may send the enrollment information 122(1) to the partner service 112(1) or the partner platform 114.

At step 306, the partner service 112(1) or partner platform 114 may send the connection request 124(1) to the API service 106. In some embodiments, the connection request 124(1) may include one or more demographic attributes 126 associated with client 110(1). Some examples of a demographic attributes include a name, email address, telephone number, physical address associated with the client 110(1). Further, in some instances, the connect request 124(1) may include a client identifier identifying the client 110(1) and a partner service identifier identifying the partner service 112(1).

At step 308, the API service 106 may receive the connection request 124, generate the TBTT 118(1) based on the connection request 124, and send the connection information 134(1) to the partner service 112(1). The connection information 134(1) may include the connection request identifier 132(1) and the web application identifier 136(1). In some embodiments, the web application identifier 136(1) may be a URL link including a TBTT 118(1). Further, the URL link may be the address of a login page of the service partner 102.

At step 310, the partner service 112(1) may redirect the client device 108(1) to the login page associated with the URL link of the web application identifier 136(1). As used herein, in some embodiments, a "redirect" may refer to a technique for forwarding a web visitor from a first domain to a second domain associated with a different URL. For instance, at step 210, the client device 108(1) may initially visit the partner service 112(1) via a web browser, and the domain of the partner service 112(1) may cause the domain of the service provider 102 to load within the web browser.

At step 312, the client device 110(1) may login into the service provider 102 at the URL link. For example, the client device 110(1) may load a webpage of the service provider 102, and provide the login information 138(1) to the service provider 102. In some embodiments, the login information 138(1) may include authentication credentials and the TBTT 118(1). Some examples of authentication credentials include a password, a PIN code, a digital certificate, a secret, a social security number, or biometric information.

At step 314, the service provider 102 may send a verification request 140(1) including the TBTT 118(1) to the API service 106. Further, upon receipt of the verification request 140(1), the API service 106 may determine the security context of the TBTT 118(1) based on a depreciation function and the TBTT 118(1). For example, the API service 106 may determine that the security context of the TBTT 118(1) is low trust based upon the elapsed time between issuance of the TBTT 118(1) and redemption of the TBTT 118(1) being greater than a first predetermined value, and lesser than a second predetermined value.

At step 316, the API service 106 may send the verification response 142(1) to the service provider 102. Further, the verification response 142(1) may instruct the service provider 102 to request the demographic information 150(1) from the client device 110(1) based on the security context of the TBTT 118(1). In some embodiments, the API service 106 may instruct the service provider 102 to request one demographic attribute. In some other embodiments, the API service 106 may instruct the service provider 102 to request a plurality of demographic attributes. Further, the amount of demographic attributes requested by the service provider 102 may correspond to the depreciation of the TBTT 118(1). For instance, if the TBTT 118(1) has depreciated multiple levels of trust, the service provider 102 may request a plurality of demographic attributes from the client device 110(1) to verify the identity of the client 110(1).

At step 318, the service provider 102 may request the demographic information 150(1) from the client device 110(1). For example, the service provider 102 may prompt the client device 108(1) for the date of birth of the client 110(1). At step 320, the service provider 102 may receive the demographic information 150(1) in response to the prompt. In some embodiments, the service provider 102 may also request the answer to the prompt from the partner service 112(1). In some other embodiments, the service provider 102 or API service 106 may locally store the expected response (i.e., the demographic attributes 126 or the client information 128) to the prompt.

At step 322, the API service 106 may receive a verification request 140(2) including the demographic information from the service provider 102, and verify the demographic information 150(1) by comparing the demographic information to the expected response. At step 324, the API service 106 may send the verification response 142(1) to the service provider 102. If the demographic information 150(1) matches the expected response, the verification response 142(1) may indicate that the service provider 102 should create the connection between the client 110(1) and the partner service 112(1). Otherwise, the verification response 142(1) may indicate that the service provider 102 should not create the connection between the client 110(1) and the partner service 112(1). As described in detail herein, once the connection has been created between the client 110(1) and the partner service 112(1), the partner service 112(1) may send the service task 120(1) to the client device 110(1) via the task management application 104. Further, the service provider 102 or API service 106 may send the connection notification 144 to the client device 108(1) or the partner service 112(1) indicating that the connection has been created.

Figure 4:
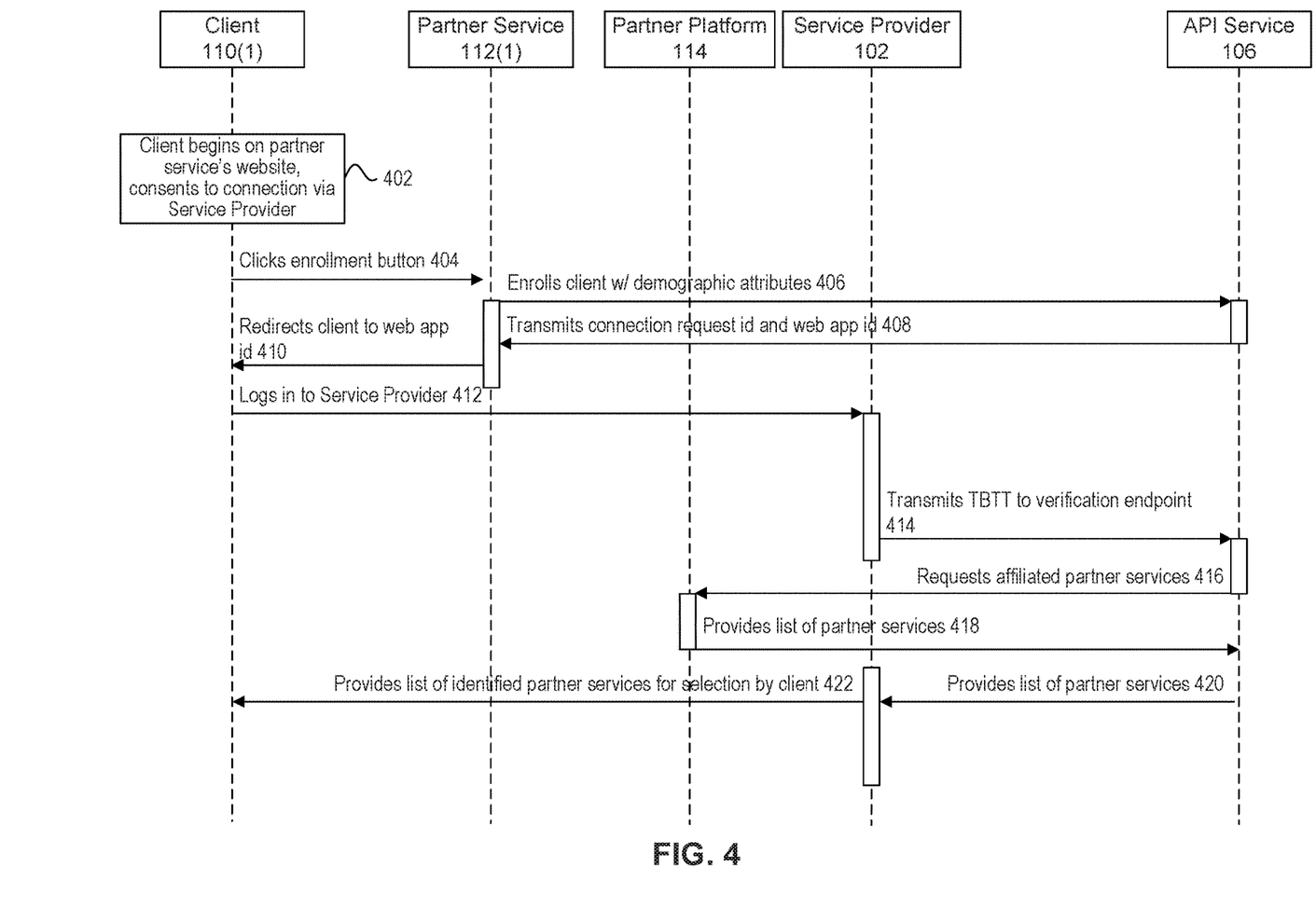
FIG. 4 is a sequence diagram illustrating an example process using time-based token trust depreciation, according to embodiments of the present disclosure.

FIG. 4 is a sequence diagram illustrating an example process using time-based token trust depreciation, according to embodiments of the present disclosure. At step 402, a client 110(1) may visit the partner service 112(1) or partner platform 114 with the intent of establishing a connection with the partner service 112(1) at the service provider 102. For example, the client 110(1) may have a pre-existing relationship with the partner service 112(1), and endeavor to manage tasks related to the partner service 112(1) via the service provider 102.

At step 404, the client 110(1) may click an enrollment button within a graphical user interface presented by the partner service 112(1) or partner platform to the client device 108(1), thereby consenting to the creation of a connection between the client 110(1) and the partner service 112(1) via the service provider 102. Further, the client device 108(1) may send the enrollment information 122(1) to the partner service 112(1) or the partner platform 114.

At step 406, the partner service 112(1) or partner platform 114 may send the connection request 124(1) to the API service 106. In some embodiments, the connection request 124(1) may include one or more demographic attributes 126 associated with client 110(1). Some examples of a demographic attributes include a name, email address, telephone number, physical address associated with the client 110(1). Further, in some instances, the connect request 124(1) may include a client identifier identifying the client 110(1) and a partner service identifier identifying the partner service 112(1).

At step 408, the API service 106 may receive the connection request 124, generate the TBTT 118(1) based on the connection request 124, and send the connection information 134(1) to the partner service 112(1). The connection information 134(1) may include the connection request identifier 132(1) and the web application identifier 136(1). In some embodiments, the web application identifier 136(1) may be a URL link including a TBTT 118(1). Further, the URL link may be the address of a login page of the service partner 102.

At step 410, the partner service 112(1) may redirect the client device 108(1) to the login page associated with the URL link of the web application identifier 136(1). As used herein, in some embodiments, a "redirect" may refer to a technique for forwarding a web visitor from a first domain to a second domain associated with a different URL. For instance, at step 210, the client device 108(1) may initially visit the partner service 112(1) via a web browser, and the domain of the partner service 112(1) may cause the domain of the service provider 102 to load within the web browser.

At step 412, the client device 110(1) may login into the service provider 102 at the URL link. For example, the client device 110(1) may load a webpage of the service provider 102, and provide the login information 138(1) to the service provider 102. In some embodiments, the login information 138(1) may include authentication credentials and the TBTT 118(1). Some examples of authentication credentials include a password, a PIN code, a digital certificate, a secret, a social security number, or biometric information.

At step 414, the service provider 102 may send a verification request 140(1) including the TBTT 118(1) to the API service 106. Further, upon receipt of the verification request 140(1), the API service 106 may determine the security context of the TBTT 118(1) based on a depreciation function and the TBTT 118(1). For example, the API service 106 may determine that the security context of the TBTT 118(1) is no trust based upon the elapsed time between issuance of the TBTT 118(1) and redemption of the TBTT 118(1) being greater than a predetermined value.

At step 416, the API service 106 may request a list of the partner services 112(1)-(N) affiliated with the client 110(1) from the partner platform 114 based on the security context of the TBTT 118(1). In some embodiments, the request may include the client information 128.

At step 418, the partner platform 114 may receive the client information 128, determine that the partner services 112(1)-(2) are associated with the client 110(1) based upon the client information 128, and send a list including the partner services 112(1)-(2) to the API service 106. For instance, the partner platform 114 may search the client profile 152(1) using the client information 128 to determine that the client 110(1) has a pre-existing relationship with the partner services 112(1)-(2). Once the partner platform 114 has identified the relationships between the client 110(1) and the partner services 112(1)-(2), the partner platform 114 may send partner identifiers identifying the partner services 112(1)-(2) to the API service 106.

At step 420, the API service 106 may instruct the service partner 102 to present the partner services 112(1)-(2) to the client 110(1) via the task management service 104. At step 422, the service provider 102 may present the partner services 112(1)-(2) within the task management application 104. Further, the client 110(1) may select to create connections with the partner services 112(1)-(2) within the task management application 104. In some embodiments, the API service 106 may perform additional authentication steps before creating the connections between the client 110(1) and the partner services 112(1)-(2), respectively.

Figure 5:
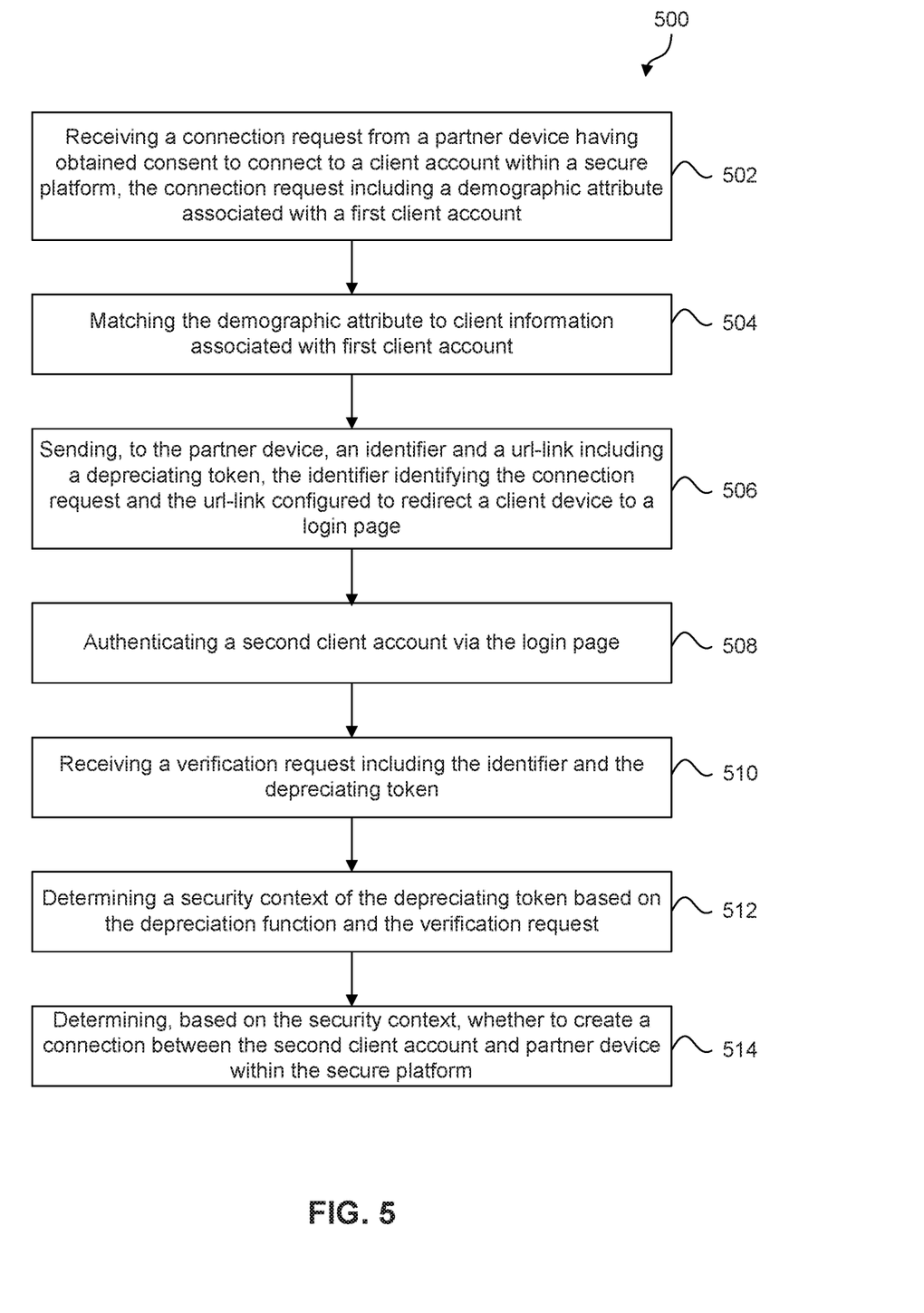
FIG. 5 is a flowchart illustrating a process implemented by a system for implementing time-based trust token depreciation, according to embodiments of the present disclosure.

FIG. 5 is a flowchart illustrating a process for implementing location identification in MFA, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed in all embodiments. Further, some of the steps may be performed simultaneously, or in a different order than shown in FIG. 4, as will be understood by a person of ordinary skill in the art.

Method 500 shall be described with reference to FIG. 1. However, method 500 is not limited to those example embodiments.

In 502, a system may receive a connection request from a partner device having obtained consent to connect to a client account within a secure platform, the connection request including a demographic attribute associated with a first client account. For example, the partner service 112(1) may send the connection request 124(1) to the API service 106 in response to receipt of the enrollment information 122(1) from the client 110(1). In some embodiments, the connection request 124(1) may include one or more demographic attributes 126 associated with client 110(1). Some examples of a demographic attributes 126 include a name, email address, telephone number, physical address associated with the client 110(1).

In 504, the system may match the demographic attribute to client information associated with the first client account. For example, upon receipt of the connection request 124(1), the API service 106 may determine whether the demographic attribute 126 matches client information 128 associated with the client 110(1). If the demographic attribute 126 matches the client information 128, the API service 106 may generate the TBTT 118(1) for creating the connection between the client 110(1) and the partner service 112(1) within the task management application 104.

In 506, the system may send, to the partner device, an identifier and a URL-link including a depreciating token, the identifier identifying the connection request and the URL-link configured to redirect a client device to a login page. For example, the API service 106 may send the connection information 134(1) to the partner service 112(1). The connection information 134(1) may include a web application identifier 136(1) including the TBTT 118, and the connection request identifier 132(1). In some examples, the web application identifier 136(1) may be a URL-link including the TBTT 118 as a query string.

In 508, the system may authenticate a second client account via the login page. For example, the client 110(1) may perform successfully authenticate to the service provider 102 via the login page associated with the web application identifier 136(1). In some embodiments, the client device 108(1) may send the login information 138 including the TBTT 118(1) to the service provider 102 during the authentication process.

In 510, the system may receive a verification request including the identifier and the depreciating token. For example, the service provider 102 may send a verification request 140(1) to the API service 106. The verification request 140(1) may include the TBTT 118(1) or an identifier of the token information 130 associated with the TBTT 118(1).

In 512, the system may determine a security context of the depreciating token based on a depreciation function and the verification request. In response to receipt of the verification request 140(1), the API service 106 may determine a security context of the TBTT 118(1) based a depreciation function. In some embodiments, the API service 106 may employ a time-based depreciation function that determines the security context (e.g., full trust, limited trust, no trust, etc.) based upon the duration of time between issuance of the TBTT 118(1) to the partner service 112(1), and redemption of the TBTT 118(1) by the client device 108(1).

In 514, the system may determine, based on the security context, whether to create a connection between the second client account and partner device within the secure platform. Once the API service 106 determines the security context of the TBTT 118(1), the API service 106 may send a verification response 142(1) to the service provider 102. The verification response 142(1) may identify the security context of the TBTT 118(1), or otherwise indicate whether the service provider should create a connection between the client 110(1) and the partner service 112(1). If the security context is full trust, the verification response 142(1) may indicate that the service provider should create the connection between the client 110(1) and the partner service 112(1).

As described in detail above, the partner service 112(1) may send the service task 120(1) to the client device 108(1) via the connection. Further, the task management application 104 may display the service task 120(1) to the client 110(1) via the client device 108(1), and the task management application 104 may facilitate performance of an action associated with the service task 120(1) based on user selection of the control 148 presented within the GUI 146.

Figure 6:
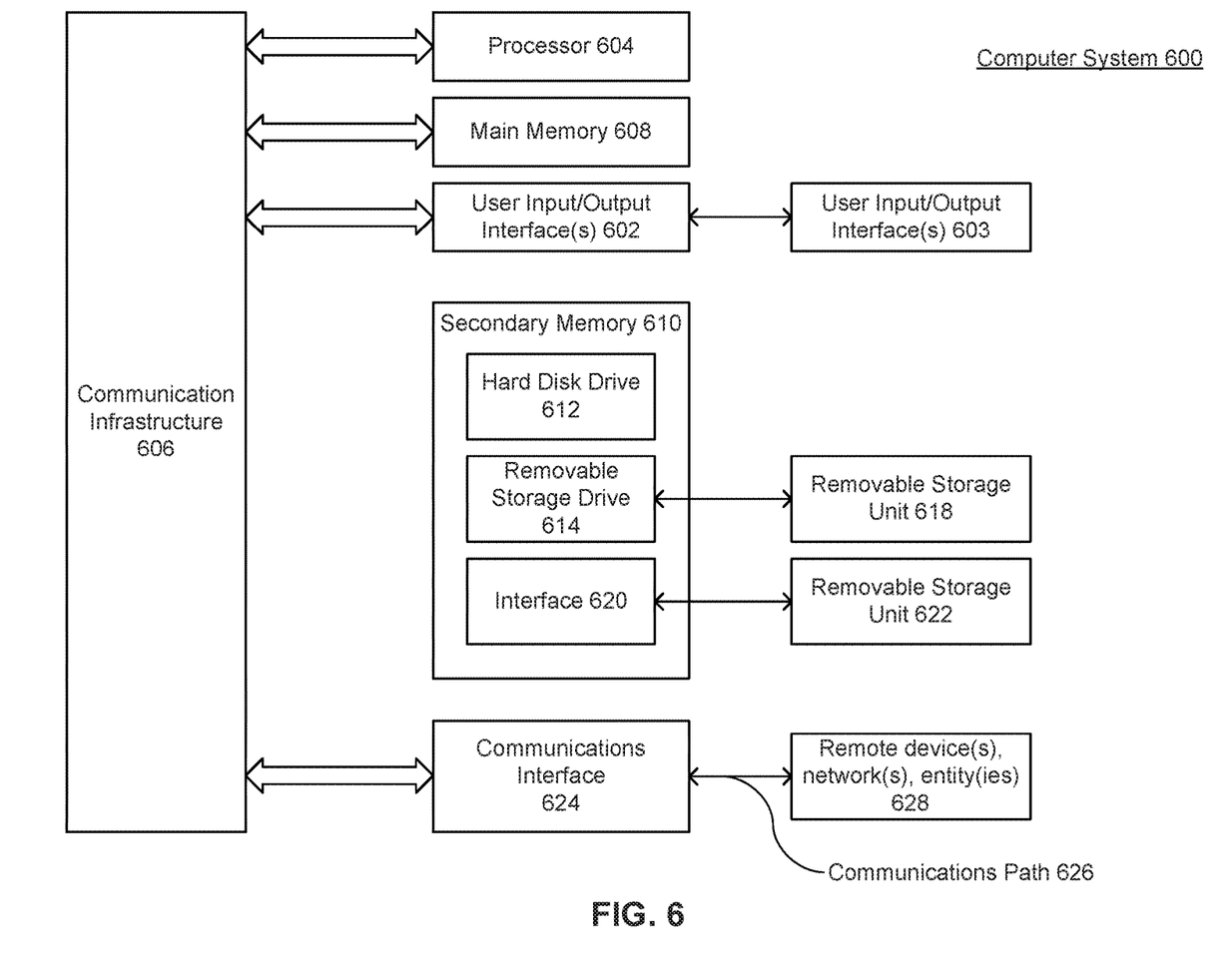
FIG. 6 illustrates a computer system, according to example embodiments of the present disclosure.

FIG. 6 is a block diagram of example components of system 600. To implement one or more example embodiments, one or more systems 600 may be used, for example, to implement embodiments discussed herein, as well as combinations and sub-combinations thereof. System 600 may include one or more processors (also called central processing units, or CPUs), such as a processor 604. Processor 604 may be connected to a communication infrastructure or bus 606.

System 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

System 600 may also include a main or primary memory 608, such as random access memory (RAM). Main memory 608 may include one or more levels of cache. Main memory 608 may have stored therein control logic (i.e., computer software) and/or data.

System 600 may also include one or more secondary storage devices or memory 610. Secondary memory 610 may include, for example, a hard disk drive 612 and/or a removable storage device or drive 614.

Removable storage drive 614 may interact with a removable storage unit 618. Removable storage unit 618 may include a computer usable or readable storage device having stored thereon computer software (control logic) and/or data. Removable storage unit 618 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 614 may read from and/or write to removable storage unit 618.

Secondary memory 610 may include other means, devices, components, instrumentalities or other approaches for allowing computer programs and/or other instructions and/or data to be accessed by system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

System 600 may further include a communication or network interface 624. Communication interface 624 may enable system 600 to communicate and interact with any combination of external devices, external networks, external entities, etc. (individually and collectively referenced by reference number 628). For example, communication interface 624 may allow system 600 to communicate with external or remote devices 628 over communications path 626, which may be wired and/or wireless (or a combination thereof), and which may include any combination of LANs, WANs, the Internet, etc. Control logic and/or data may be transmitted to and from system 600 via communication path 626.

System 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms. In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

It is to be appreciated that the Detailed Description section, and not Abstract section, is intended to be used to interpret the claims. The Abstract section may set forth one or more but not all example embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Identifiers, such as "(a)," "(b)," "(i)," "(ii)," etc., are sometimes used for different elements or steps. These identifiers are used for clarity and do not necessarily designate an order for the elements or steps.

The breadth and scope of the present invention should not be limited by any of the above-described example embodiments, but should be defined only in accordance with the following claims and their equivalents.

What is claimed is:

1. A method comprising:
    transmitting, by one or more computing devices and to an API service, a connection request received from a client device;
    receiving, by the one or more computing devices and from the API service, an identifier and a universal resource locator link (URL-link) including a depreciation token, the identifier identifying the connection request;
    redirecting, by the one or more computing devices, the client device to a login page based on the URL-link;
    establishing, by the one or more computing devices, a connection with the client device based on a verification response generated indicating that the connection should be established with the client device,
        wherein the verification response is generated based on a determined security context of the depreciation token, and
        wherein the security context is determined based on a duration of time between issuance of the depreciation token and redemption of the depreciation token by the client device; and
    based on establishing the connection, transmitting, by the one or more computing devices, a service task to be performed by a user of the client device to facilitate performance of an action.

2. The method of claim 1, further comprising transmitting, by the one or more computing devices, the service task via a task management application.

3. The method of claim 2, wherein the service task comprises fulfilling by the user, via the task management application, a payment request made by a second user to the user for services rendered by the second user to the user.

4. The method of claim 2, wherein the service task comprises providing a signature by the user, via the task management application, to facilitate performance of the action.

5. The method of claim 2, wherein the service tasks comprises providing information by the user, via the task management application, to facilitate performance of the action.

6. The method of claim 1, further comprising transmitting, by the one or computing devices, the service task for display on a graphical user interface (GUI) of the client device.

7. The method of claim 1, further comprising receiving, by the one or more computing devices, a connection notification indicating that the connection has been established.

8. A non-transitory computer-readable device having instructions stored thereon that, when executed by at least one computing device, cause the at least one computing device to perform operations comprising:
    transmitting, by one or more computing devices and to an API service, a connection request received from a client device;
    receiving, by the one or more computing devices and from the API service, an identifier and a universal resource locator link (URL-link) including a depreciation token, the identifier identifying the connection request;
    redirecting, by the one or more computing devices, the client device to a login page based on the URL-link;
    establishing, by the one or more computing devices, a connection with the client device based on a verification response generated indicating that the connection should be established with the client device,
        wherein the verification response is generated based on a determined security context of the depreciation token, and
        wherein the security context is determined based on a duration of time between issuance of the depreciation token and redemption of the depreciation token by the client device; and based on establishing the connection, transmitting, by the one or more computing devices, a service task to be performed by a user of the client device to facilitate performance of an action.

9. The non-transitory computer-readable device of claim 8, wherein the operations further comprise transmitting, by the one or more computing devices, the service task via a task management application.

10. The non-transitory computer-readable device of claim 9, wherein the service task comprises fulfilling by the user, via the task management application, a payment request made by a second user to the user for services rendered by the second user to the user.

11. The non-transitory computer-readable device of claim 9, wherein the service task comprises providing a signature by the user, via the task management application, to facilitate performance of the action.

12. The non-transitory computer-readable device of claim 9, wherein the service task comprises providing information by the user, via the task management application, to facilitate performance of the action.

13. The non-transitory computer-readable device of claim 8, wherein the instructions further comprise transmitting, by the one or computing devices, the service task for display on a graphical user interface (GUI) of the client device.

14. The non-transitory computer-readable device of claim 8, wherein the instructions further comprise receiving, by the one or more computing devices, a connection notification indicating that the connection has been established.

15. A system comprising:
a communications interface configured to process stored instructions to communicate with external devices over a wired or wireless network, wherein the communication interface is further configured to:
transmit, to an API service, a connection request received from a client device,
receive, from the API service, an identifier and a universal resource locator link (URL-link) including a depreciation token, the identifier identifying the connection request; and a processor configured to:
redirect the client device to a login page based on the URL-link,
establish a connection with the client device based on a verification response generated indicating that the connection should be established with the client device,
wherein the verification response is generated based on a determined security context of the depreciation token,
wherein the security context is determined based on a duration of time between issuance of the depreciation token and redemption of the depreciation token by the client device; and
generate a service task; and
based on establishing the connection with the client device, the communications interface is further configured to transmit the service task to be performed by a user of the client device to facilitate performance of an action.

16. The system of claim 15, wherein the communications interface is further configured to transmit the service task via a task management application.

17. The system of claim 16, wherein the service task comprises fulfilling by the user, via the task management application, a payment request made by a second user to the user for services rendered by the second user to the user.

18. The system of claim 16, wherein the service task comprises providing a signature by the user, via the task management application, to facilitate performance of the action.

19. The system of claim 16, wherein the service task comprises providing information by the user, via the task management application, to facilitate performance of the action.

20. The system of claim 15, wherein the communications interface is further configured to transmit the service task for display on a graphical user interface (GUI) of the client device.

* * * * *